United States Patent
Chen et al.

(10) Patent No.: US 7,359,290 B2
(45) Date of Patent: Apr. 15, 2008

(54) POWER SAVING METHOD OF A CHIP-ON-GLASS LIQUID CRYSTAL DISPLAY

(75) Inventors: Chien-Ru Chen, Hsinhua (TW); Jung-Zone Chen, Hsinhua (TW); Ying-Lieh Chen, Hsinhua (TW)

(73) Assignee: Himax Technologies Limited, Sinshih Township (TW)

( * ) Notice: Subject to any disclaimer, the term of this patent is extended or adjusted under 35 U.S.C. 154(b) by 198 days.

(21) Appl. No.: 11/373,286

(22) Filed: Mar. 13, 2006

(65) Prior Publication Data

US 2006/0203138 A1 Sep. 14, 2006

(30) Foreign Application Priority Data

Mar. 11, 2005 (TW) .............................. 94107559 A (51) Int. Cl.
G04C 17/00 (2006.01)
G09G 3/36 (2006.01)
G06F 3/038 (2006.01)

(52) U.S. Cl. ....................... 368/242; 345/100; 345/212

(58) Field of Classification Search ................. 368/10, 368/82, 84, 242; 345/60, 98, 100, 212
See application file for complete search history.

(56) References Cited

U.S. PATENT DOCUMENTS

| 7,057,610 | B2 * | 6/2006 | Kataoka et al. ............. 345/211 |
| 7,126,572 | B2 * | 10/2006 | Koga et al. .................... 345/89 |
| 2004/0233149 | A1 * | 11/2004 | Wang et al. ................... 345/87 |
| 2006/0007217 | A1 * | 1/2006 | Kanbe et al. ................ 345/204 |
| 2006/0071893 | A1 * | 4/2006 | Nishina et al. ................ 345/89 |
| 2007/0146354 | A1 * | 6/2007 | Kubota et al. .............. 345/204 |

* cited by examiner

*Primary Examiner*—Vit W Miska
(74) *Attorney, Agent, or Firm*—McDermott Will & Emery LLP (57) ABSTRACT

A power saving method of a chip-on-glass liquid crystal display. The method first (a) wakes up the source drivers of the LCD and (b) transmitting the image data and control signals from the source driver corresponding to the FPC to the farthest waked source drivers, and then switching them to power-saving mode. Steps (b) and (c) are repeated until all the source drivers are switched to power-saving mode.

8 Claims, 10 Drawing Sheets

POWER SAVING METHOD OF A CHIP-ON-GLASS LIQUID CRYSTAL DISPLAY

This application claims the benefit of Taiwan application Serial No. 94107559, filed Mar. 11, 2005, the subject matter of which is incorporated herein by reference.

BACKGROUND OF THE INVENTION

1. Field of the Invention

The invention relates in general to a liquid crystal display, and more particularly to a chip-on-glass liquid crystal display.

2. Description of the Related Art

Liquid crystal displays (LCD) have become more and more popular in computer monitors or TVs due to their light weight, flatness and low radiation, compared with the CRT monitor. In addition to improving the display quality of LCDs, such as color, contrast and brightness, the manufacturers try to improve the manufacturing process to reduce the cost and manufacturing time.

The LCD includes a timing controller, source drivers and at least one gate driver to drive its liquid crystal panel. Conventionally, the timing controller is welded on a control print circuit board, the source drivers are welded on an X-board, and the gate driver is welded on a Y-board. The control print circuit board connects to the X-board via flexible printed circuit boards (FPCs), while the X-board and the Y board each connects to the liquid crystal panel via other FPCs. Therefore, the conventional LCD requires at least three boards to be connected to the panel and the manufacturing process is thus complex. In order to simplify the manufacturing process, the chip-on-glass (COG) LCD has been developed.

Figure 1:
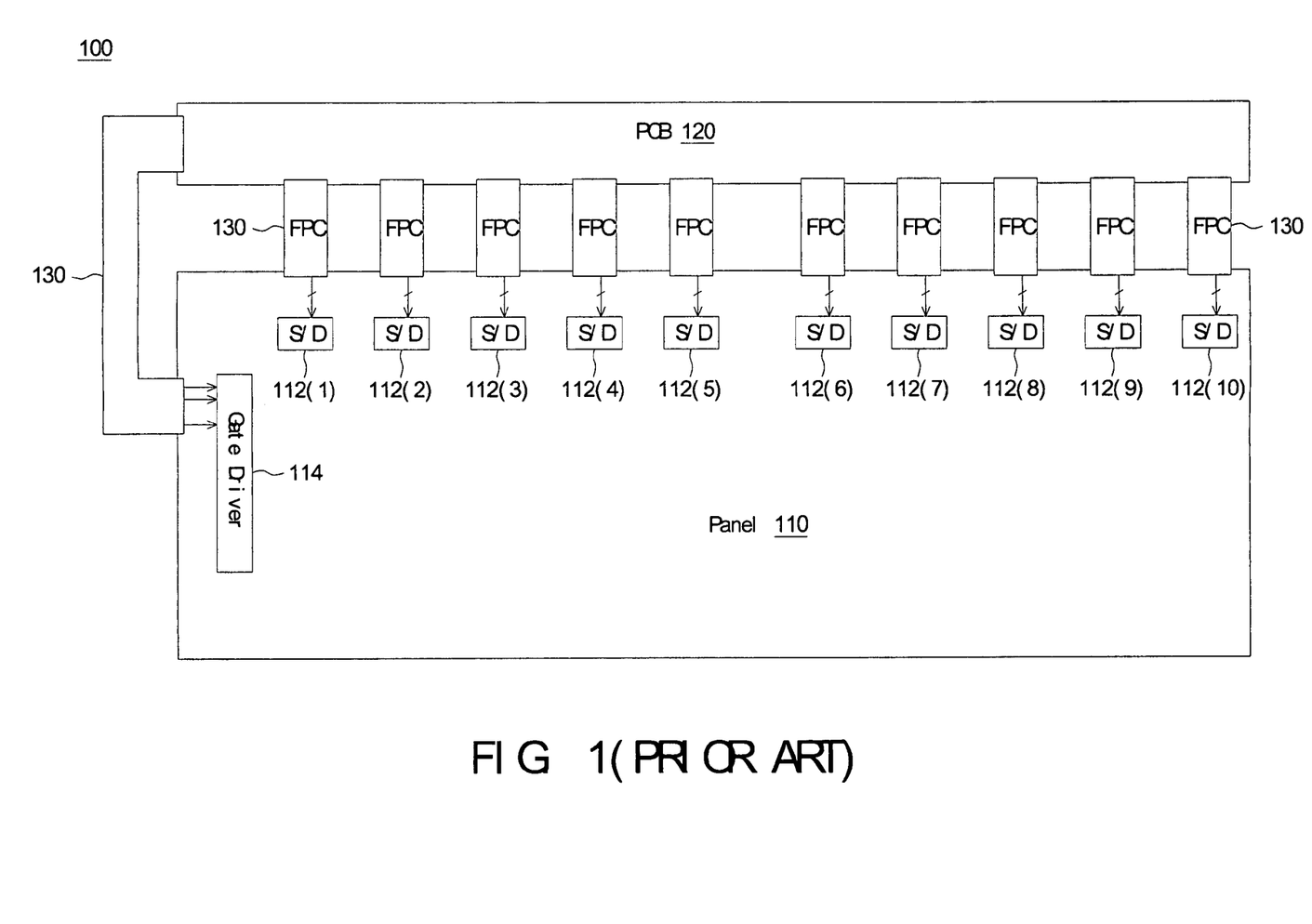
FIG. 1 is diagram of a conventional COG LCD.

FIG. 1 is diagram of a conventional COG LCD. The COG LCD 100 includes a panel 110, a plurality of source drivers 112, at least one gate driver 114, a printed circuit board 120 and a plurality of flexible printed circuit boards 130. The source drivers 112 and the gate driver 114 are disposed on the glass substrate of the panel 110 and electrically connected to the printed circuit board 120 via the flexible printed circuit boards 130. The timing controller (not shown in FIG. 1) is disposed on the printed circuit board 120, and outputs image data and control signals to the source drivers 112 and the gate driver 114. In COG LCD 100, only one board (PCB 120), instead of three, is required to connect to the panel 110 via the FPCs 130. Therefore, manufacturing process is simplified.

However, the manufacturing process of COG LCD is still not simplified enough because a plurality of flexible printed circuit boards are needed, and in the above example in FIG. 1, the number of flexible printed circuit boards is 11. The flexible printed boards need a plurality of contact points with the liquid crystal panel and the possibility of electrical contact failure is thus increased.

SUMMARY OF THE INVENTION

It is therefore an object of the invention to provide a COG LCD that reduces the number of flexible printed circuit boards and to provide a transmission method for the LCD.

It is another object of the invention to provide a method for generating gate control signals for reducing the number of the flexible printed circuit boards.

Furthermore, it is another object of the invention to provide an identifier of the source driver of the COG LCD and an identifying method thereof.

It is another object of the invention to provide a source driver for single-way or dual-way transmission of the image data and the control signals from the timing controller.

It is another object of the invention to provide a method for transmitting control signals by packets so as to reduce the number of transmission lines to one or a limited number and reduce the number of flexible printed circuit boards.

It is another object of the invention to provide a method for power management so as to save power consumption of the COG LCD.

The invention achieves the above-identified objects by providing a power saving method of a liquid crystal display. The LCD has a glass substrate, at least a flexible printed circuit board, a timing controller and source drivers. The source drivers are disposed on the glass substrate and connected in series, and the flexible printed circuit board is connected to the corresponding one of the source drivers for transmitting image data and control signals from the timing controller to the corresponding source driver. The image data and the control signals are then transmitted to the source drivers near the corresponding source driver in dual way. The method includes the following steps. (a) The source drivers are waked up. Next, step (b) transmits the image data and the control signals from the source driver corresponding to the flexible printed circuit board to the farthest waked source drivers. Next, step (c) switches the farthest waked source drivers to a power-saving mode. Steps (b) and (c) are repeated until all the source drivers are switched to the power-saving mode.

The invention achieves the above-identified objects by providing a power saving method of a liquid crystal display. The method includes the following steps. Step (a) switches the source drivers to a power-saving mode. Step (b) transmits the image data and the control signals to the source driver corresponding to the flexible printed circuit board and waking up the corresponding source driver. Step (c) transmitting the image data and the control signals from the corresponding source driver to the source drivers in power-saving mode near the corresponding source driver and waking up the near source drivers. Steps (b) and (c) are repeated until all the source drivers are waked up.

The invention achieves the above-identified objects by providing a power saving method of a liquid crystal display. The method includes the following steps. Step (a) wakes up the source drivers coupled to the first side of the corresponding source driver, and switching the source drivers coupled to the second side of the corresponding source driver into a power-saving mode. Step (b) transmits the image data and the control signals to the waked-up source driver at the first side farthest to the corresponding source driver, and to the power-saving-mode source driver at the second side nearest to the corresponding source driver. Step (c) switches the farthest wake-up source driver into the power-saving mode and wakes up the nearest power-saving-mode source driver. Steps (b) and (c) are repeated until all the source drivers receive the image data and the control signals.

The invention achieves the above-identified objects by providing a method for generating a gate control signal of a liquid crystal display. The method first provides image data and a source control signal to the source drivers. Next, one source driver is selected to generate a gate control signal to the gate driver according to the source control signal for driving the panel by the gate driver and the source drivers.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 2A:
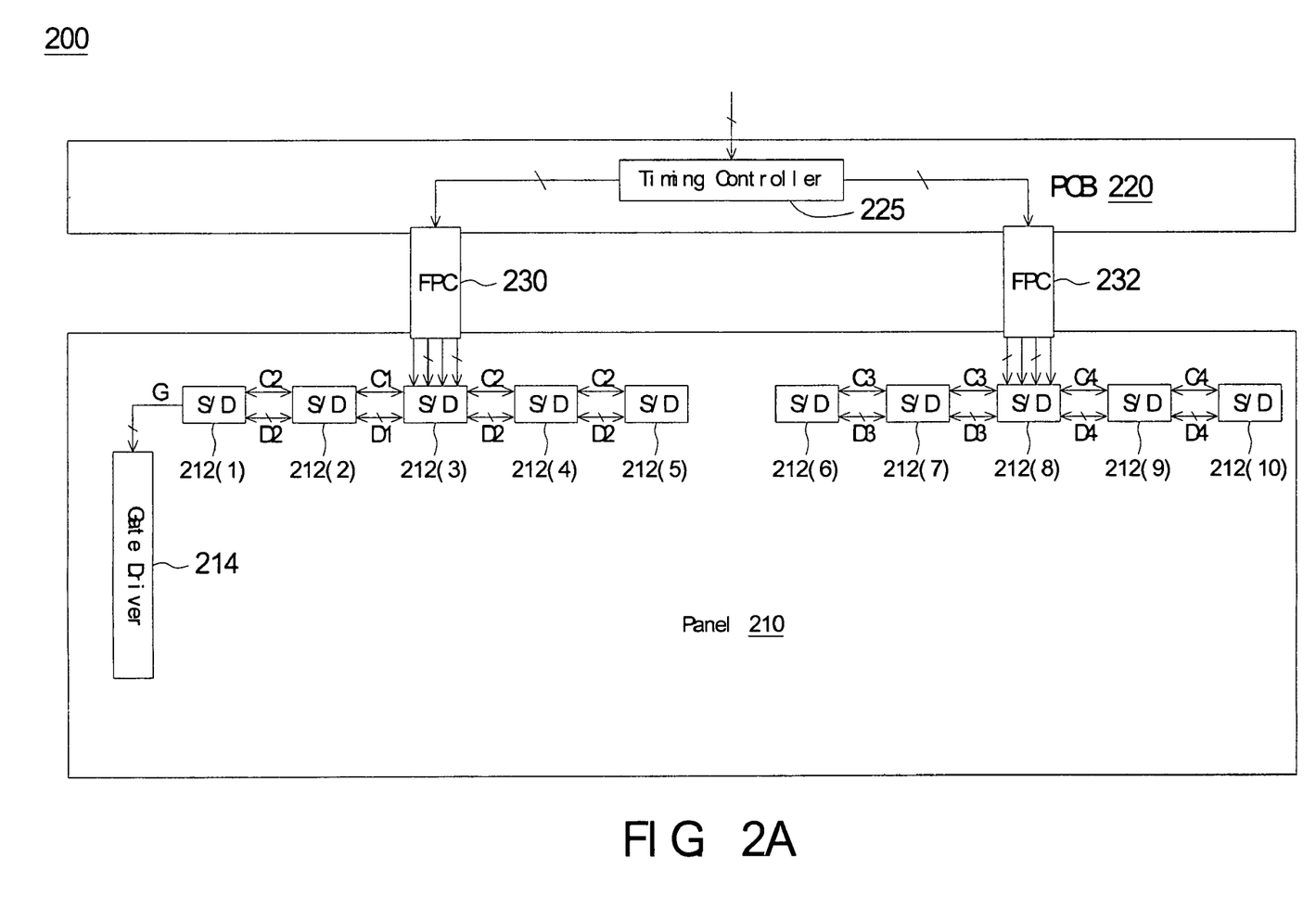
FIG. 2A is a diagram of a chip-on-glass (COG) liquid crystal display (LCD) according to a preferred embodiment of the invention.

FIG. 2A is a diagram of a chip-on-glass (COG) liquid crystal display (LCD) according to a preferred embodiment of the invention. The LCD 200 includes a panel 210, a plurality of source drivers (S/D) 212(1)-212(10), at least one gate driver 214, a printed circuit board 220 and flexible printed circuit boards (FPC) 230 and 232. The source drivers 212 and gate driver 214 are disposed on the glass substrate of the panel 210 by chip-on-glass technology. The timing controller 225 is disposed on the printed circuit board 220 for outputting image data and control signals both to source drivers 212(3) and 212(8) respectively via the flexible printed circuit boards 230 and 232. Via the wires on the glass substrate, the source driver 212(3) transmits the image data and the control signals to the neighboring source drivers 212(1), 212(2), 212(4) and 212(5), and the source driver 212(8) transmits the image data and the control signals to the neighboring source drivers 212(5), 212(6), 212(7), 212(8) and 212(10). Based on the control signals, one of the source drivers, such as the source driver 212(1), which is nearest to the gate driver 214, can generate gate control signals G to the gate driver 214. The reason to choose the source driver nearest to the gate driver 212 is to reduce the length of the wire therebetween so as to effectively reduce the distortions and delays of the gate control signals G. It is worthy of noting that other source drives can also be used to generate the gate control signals G, not just limited to the source driver 212(1). In this embodiment, the number of flexible printed circuit boards are greatly reduced to 2 because the LCD uses the wires disposed on the glass substrate for transmitting the image data and the control signals.

Each of the source drivers 212 has a first operation mode and a second operation mode. The source driver 212(3) and the source driver 212(8) are set to the first operation mode to execute the dual-way transmission. That is, the source driver 212(3) and the source driver 212(8) each receives the image data and control signals from the timing controller 225 and transmits them to the neighboring source drivers at both the right side and the left side thereof. Taking the source driver 212(3) for example, the source driver 212(3) can simultaneously transmit the image data and control signals to both the neighboring source driver 212(2) and 212(4), which are located at the two sides of the source driver 212(3). The source drivers 212(1), 212(2), 212(4)-212(7), 212(9) and 212(10) are set to the second operation mode to execute single-way transmission, and are not directly connected to the timing controller 225. That is, the source drivers 212(1), 212(2), 212(4)-212(7), 212(9) and 212(10) each can receive the image data and the control signals from the right (or left) source driver and transmit them to the left (or right) source driver. Taking the source driver 212(2) for example, it receives the image data and the control signals from the source driver 212(3) at the right side thereof and transmits them to the source driver 212(1) at the left side thereof. In the embodiment, the LCD 200 is a big screen monitor having 10 source drivers and two flexible printed circuit board 230 and 232. The number of flexible printed circuit boards is not limited to two as long as the distortions and delays of signals are acceptable.

In the embodiment, the source drivers are divided into a left group including source drivers 212(1)-212(5) and a right group including source drivers 212(6)-212(10). The flexible printed circuit board 230 connects to the center source drivers 212(3) of the left group, and the flexible printed circuit board 232 connects to the center source drivers 212(8) of the right group, such that the distortions and delays of signals, caused by the parasitic capacitance and resistance, can be minimized. On the other hand, the source drivers can also be divided into more than three groups and each group directly connects to the timing controller via a flexible printed circuit board, so long as the distortions and delays of the signals are acceptable.

Figure 2B:
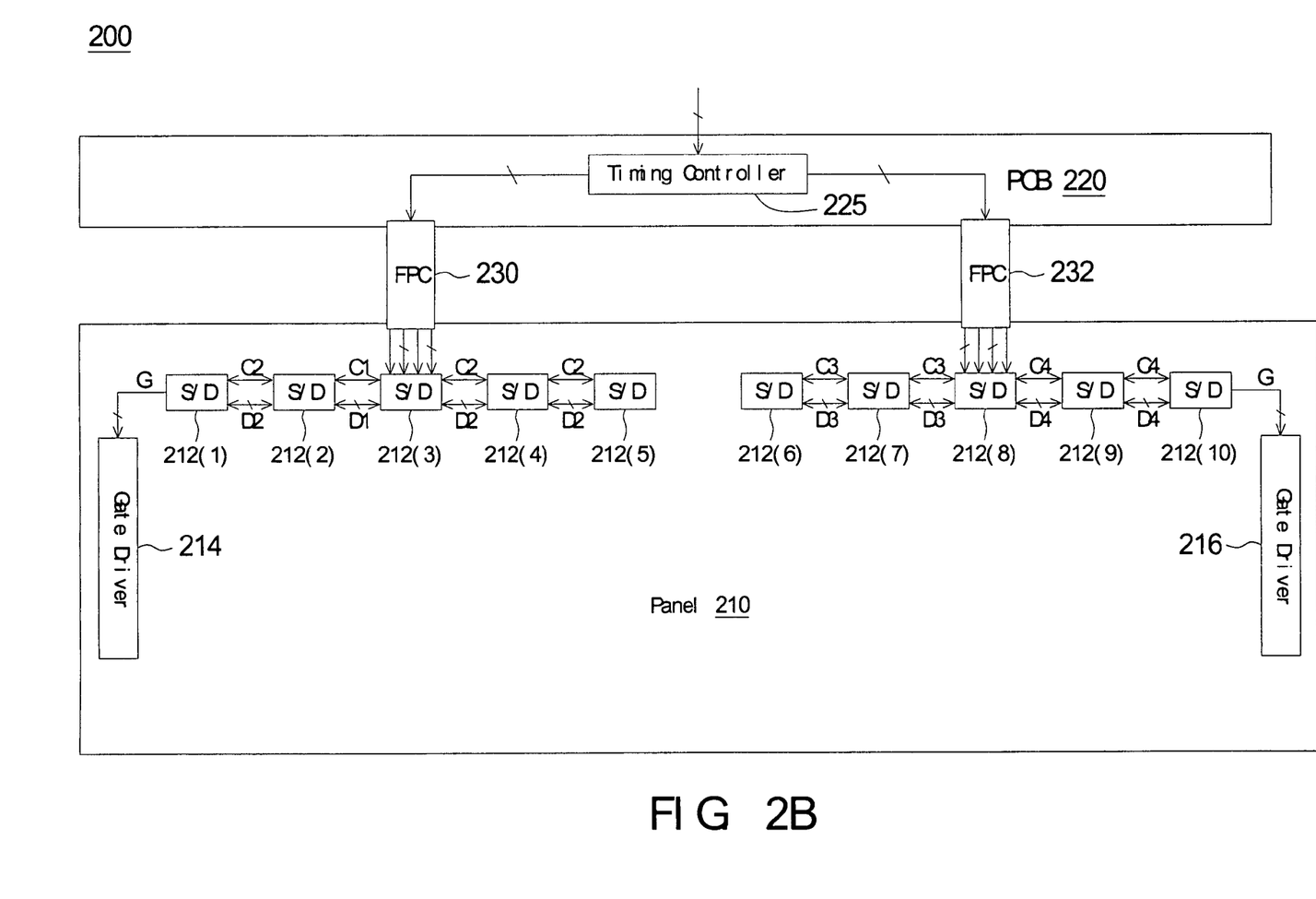
FIG. 2B is a diagram of a COG LCD according to another preferred embodiment of the invention.

FIG. 2B is a diagram of a COG LCD 250 according to another preferred embodiment of the invention. Compared with the LCD 200, the LCD 250 further includes a gate driver 216 at the right side of the panel 210. The gate drivers 214 and 216 together drive the panel 210 from two sides thereof. The other elements of LCD 250 are the same as those as described above.

Figure 3:
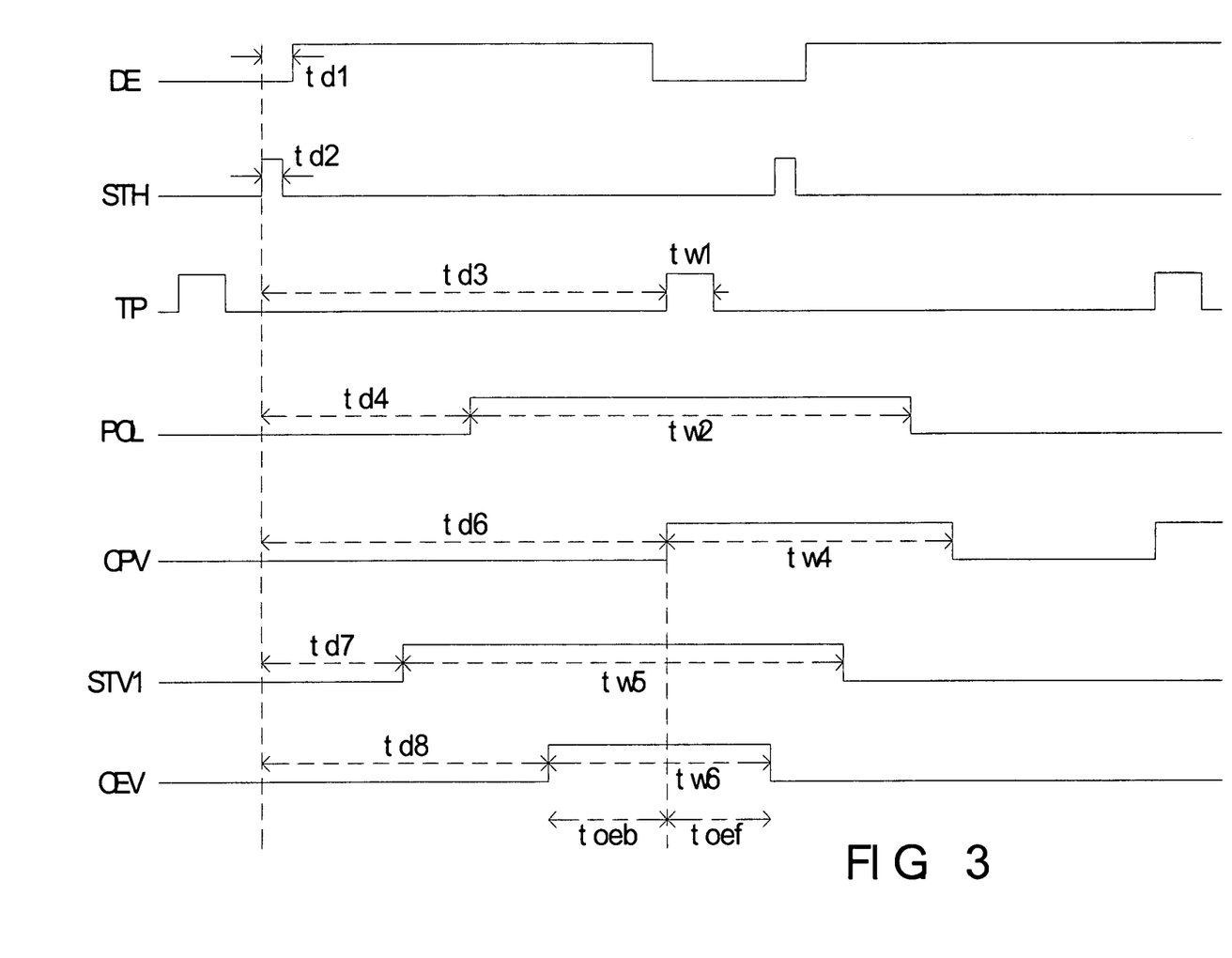
FIG. 3 is a diagram of control signals of the source drivers and the gate drivers of the LCD.

FIG. 3 is a diagram of control signals of the source drivers and the gate drivers of the LCD. The control signals include gate control signals G and source control signals S. The gate control signals G include a gate driver start signal STV for representing the start of a frame, a gate clock signal CPV for enabling a gate line, and a gate driver output enable signal OEV for defining the enabled duration of the gate line. The source control signals S include a source driver start signal STH for notifying the source driver to start to prepare the data of a horizontal line, a data enable signal DE for starting to receive data, a load signal TP for starting to output driving voltages to the data lines, and a polarization control signal POL for controlling the polarization inversion.

When the source driver start signal STH is asserted, the source driver 212 starts to prepare to receive data, and after a period td1, the data enable signal DE is asserted such that the timing controller 225 starts to output the image data to the source drivers 212. The source drivers 212 generate the driving voltage with the polarization designated by the polarization control signal POL and then outputs the driving voltages to the panel 210 according to the load signal Tp.

In the conventional LCD 100, the control signals are outputted by the timing controller directly to each source driver 112 and the gate driver 114. Each control signal conventionally needs at least one wire to transmit, and thus a plurality of wires are required. The control signals are easily distorted and delayed because the wires between the timing controller and the source drivers and the gate driver have parasitic capacitance and resistance.

In the present embodiment, the timing controller 225 integrates the control signals into a control bitstream C and transmits it by a wire to the source drivers 212. For example, the control signals can be packed into a plurality of control packets, each representing an event relevant to a control signal. The timing controller 225 can designate one source driver 212 to receive the control packet by a target identification. The target identification is, for example, included in the control packet for each source driver to identify. After receiving the control packet, the source driver 212 can decode the control packet to generate the control signal. Therefore, the number of the wires required to transmit the control signals is thus greatly reduced in the present embodiment.

The source driver 212 has a built-in identification so as to identify whether a received control packet is for its own by comparing the target identification of the control packet with the built-in identification.

[Transmission Protocol of the Control Bitstream]

Conventionally, the control signals are each transmitted by a wire from the timing controller to the source driver/gate driver. The source drivers and the gate driver each needs a plurality of control signals and thus the number of the wires for transmitting the control signals is great. Therefore, number of wires in the conventional flexible printed circuit board is also great. The conventional structure thus requires a flexible printed circuit board of high-cost and quality. The lengths of the wires between the timing controller and the source drivers/gate driver are so long as to incur delays and distortions of the signals.

In the present embodiment, the timing controller 225 transmits a control bitstream C to the source driver a minimum of wires. The control bitstream C includes a plurality of control packets, each representing an event of one corresponding control signal, such as a pull high event or a pull low event. After receiving the control packet, the source driver 212 generates the corresponding control signal by pulling high or pulling low accordingly.

Figure 4:
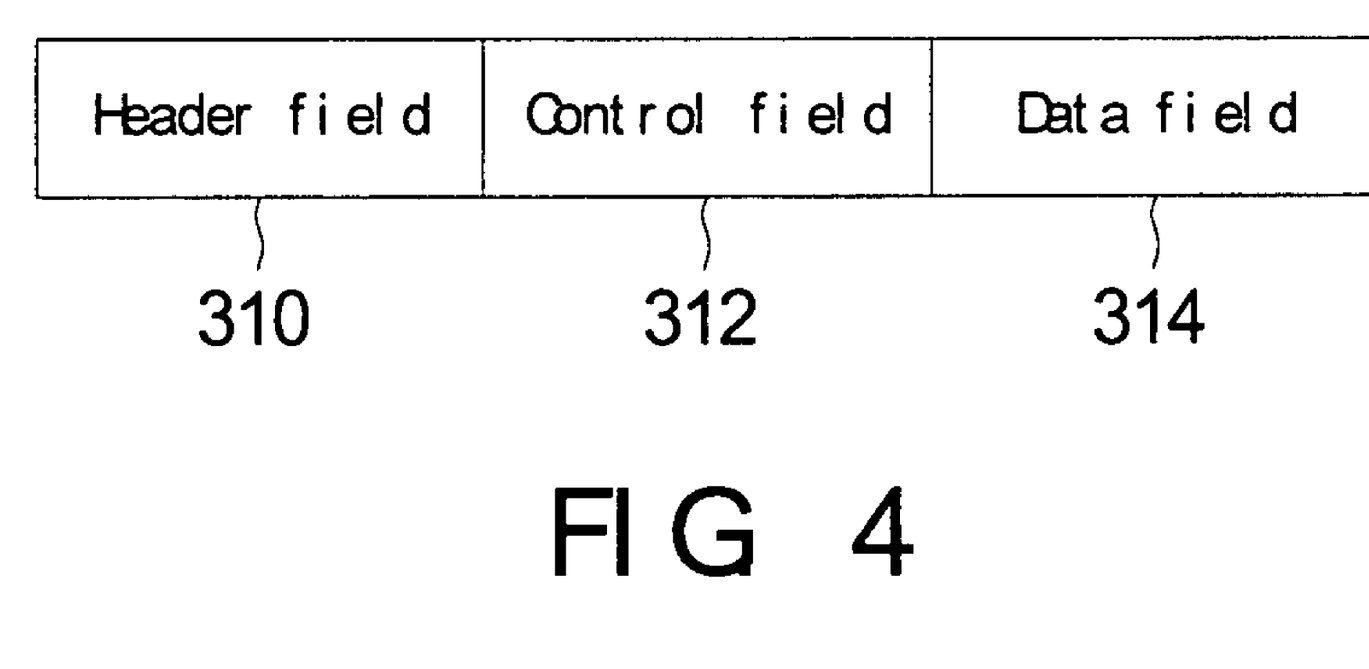
FIG. 4 is a format diagram of a control packet.

FIG. 4 is a format diagram of a control packet. A control packet includes a header field 310 and a control item, which includes a control field 312 and a data field 314. The header field 310 records a predetermined pattern for identifying the start of a packet, for example, 0x11111. The control field 312 records the type of the event, such as the STH event, the TP event, the pull high event, the pull low event and the initialization event. The data field 314 records the parameters of the event.

In the present embodiment, each control packet has 16 bits. If receiving the control packet by dual-edge sampling, it takes 8 clocks to read one control packet. That is, the control signal generated by a pull high event and a pull low event must remain at high level for at least a duration of 8 clocks. The control signals POL, CPV, STV, OEV can each be generated by a pull high event and a pull low event. The control signal that has a duration of less than 8 clocks, such as control signals STH and TP, are generated respectively by the STH event and the TP event. After receiving the STH event/TP event, the source driver pulls high the control signal STH/TP for a pre-determined period td2/tw1 and then pulls low the control signal STH/TP. It is worth noticing that the sampling method for receiving the control packet is not limited to dual-edge sampling Rising-edge sampling or falling-edge sampling can also be used.

In regard to the control packet having the control field 312 recording the STH event, the data field 314 thereof records the target identification. For example, the source drivers 212(1)-212(10) have the built-in identifications of 0x0001-0x1010, respectively. After receiving the control packet with STH event, the source driver compares the target identification of this control packet with the built-in identification, pulls high the control signal STH if the comparison is matched, and then pulls low the control signal STH after a period td2.

From FIG. 3, it can be seen that the control signals TP and CPV are pulled high at the same time, so after receiving the control packet with TP event, control signals TP and CPV are pulled high. The control signal TP is then pulled low after a period tw1, and the control signal CPV is pulled low after receiving the control packet with pull low event of CPV.

Control signals POL, STV and OEV are generated by a pull high event and a pull low event. In regard to the control packet with the control field 312 recording a pull high event, its data field 314 designates which signal is to be pulled high. In regard to the control packet with the control field 312 recording a pull low event, its data field 314 designates which signal is to be pulled low.

In regard to the control packet with the control field 312 recording an initialization event, several kinds of initialization can be set, such as the fan out of the source drivers. Other kinds of events can also be represented by the control packets.

In the present embodiment, a minimum of wires is required to transmit the control bitstream C, the number of wires connecting the timing controller and the source drivers are greatly reduced, the layout of the circuit is simplified, and stability is enhanced. In addition, the control bitstream C can integrate only a part of the control signals and leave other parts of the control signals to be transmitted respectively in independent wires. Although not all the control signals are integrated to the control bitstream, the number of wires can still be reduced.

[Source Drivers]

Figure 5A:
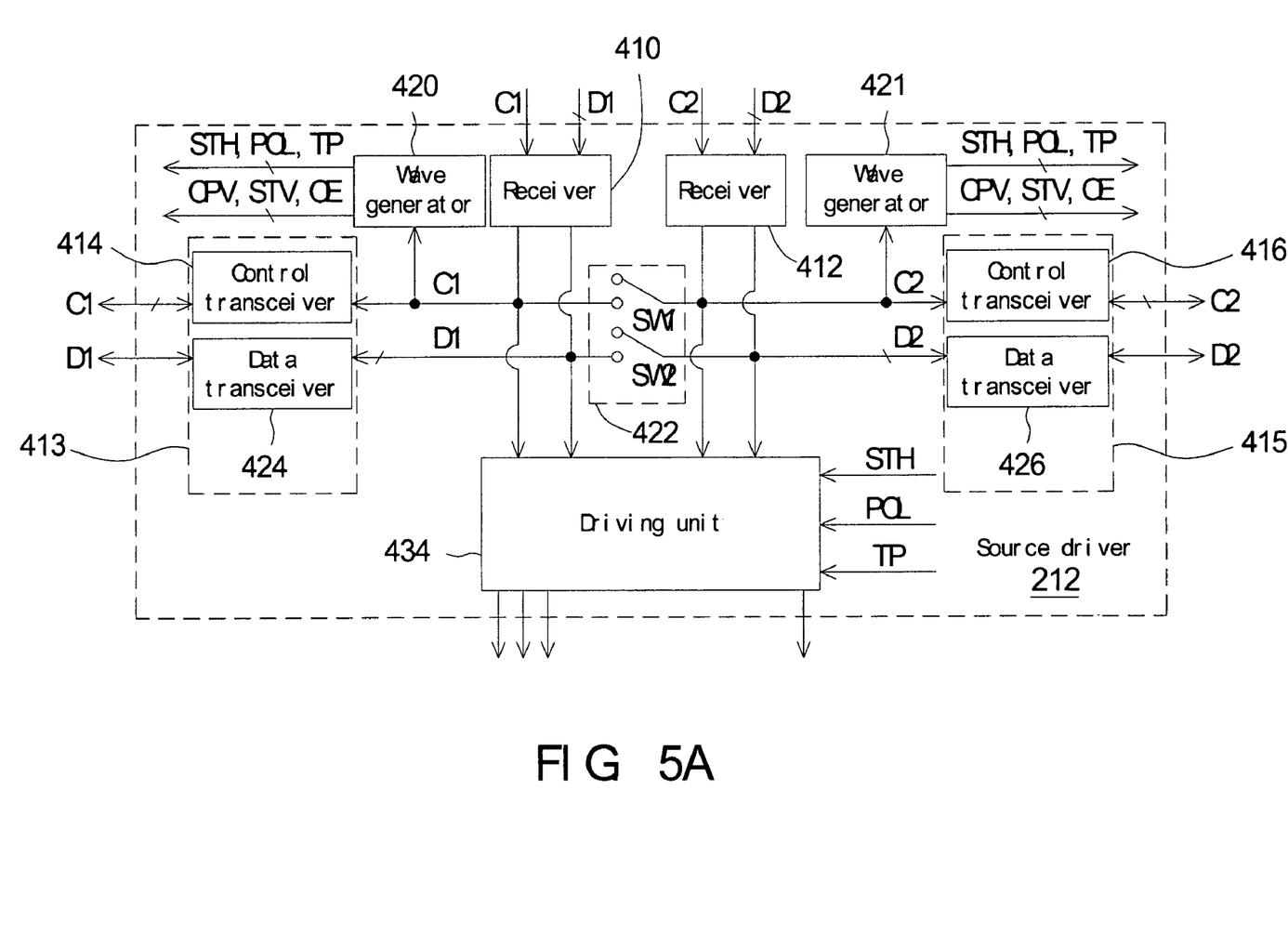
FIG. 5A is a diagram of the source driver according to the preferred embodiment of the invention.

FIG. 5A is a diagram of the source driver according to the preferred embodiment of the invention. The source driver 212 includes receivers 410, 412, transceivers 413, 415, a bus switch 422, wave generators 420, 421, and a driving unit 434. The transceiver 413 includes a control transceiver 414 and a data transceiver 424, and the transceiver 415 includes a control transceiver 416 and a data transceiver 426.

The bus switch 422 includes two switches SW1 and SW2. When the source driver, 212(3) or 212(8) in this embodiment, operates at a first operation mode, the bus switch turns off the switches SW1 and SW2 such that the control transceiver 414 and 416 are disconnected from each other and the data transceiver 424 and 426 are disconnected from each other. Thus, the control bitstream C1 and the image data D1 received by the receiver 410 are transmitted to the control transceiver 414 and the data transceiver 424, respectively, and the control bitstream C2 and the image data D2 received by the receiver 410 are transmitted to the control transceiver 416 and the data transceiver 426, respectively.

When the source driver, 212(1)-212(2), 212(4)-212(7), 212(9), or 212(10) in this embodiment, operates in a second operation mode, the receivers 410 and 412 are disabled, and the bus switch turns on the switches SW1 and SW2 such that the transceivers 413 and 415 are interconnected, that is, the data transceivers 424 and 426 are connected to each other and the control transceivers 414 and 416 are connected to each other. Thus, the source driver can transmit the control bitstream and the image data received to the next adjacent source driver in response to the designated transmission direction.

The wave generators 420 and 421 receive the control bitstream C1 and C2, respectively, for generating source control signals S, such as STH(1), STH(2), POL(1), POL(2), TP(1) and TP(2), etc., and thus generating the gate control signals G, such as CPV(1), CPV(2), STV(1), STV(2), OEV(1), OEV(2) and etc. The control signals G are generated by one of the source drivers. In the LCD 200 in FIG. 2A, one of the source drivers 212, such as 212(1) that is nearest to the gate driver 214, generates the gate control signals G, while the other source drivers 212 do not. In the LCD 250 in FIG. 2B, two source drivers, such as 212(1) and 212(10) that are respectively nearest to the gate drivers 214 and 216, generate the gate control signals G respectively for the gate drivers 214 and 216, while others do not.

When receiving the signal STH, the driving unit 434 starts to latch image data D for converting to analog driving voltages in response to the signal POL, and then transmits the analog driving signals to the panel 210 after receiving the load signal TP.

In the first-operation-mode source driver, such as 212(3), the wave generators 420 and 421 are both activated to receive the control bitstreams C1 and C2, respectively, and generate the source control signals S and the gate control signals G, while the control bitstream C1 and C2 are independent, and image data D1 and D2 are independent. On the other hand, in the second-operation-mode source driver, such as 212(2) or 212(4), the control bitstream C1 is the control bitstream C2, and the image data D1 is the image data D2, so only one of the wave generators 420 and 421 is activated to generate the source control signals S and the gate control signals G. The other wave generator in the second-operation-mode source driver can be disabled, omitted or still activated to generate the source control signals S and the gate control signals G.

Figure 5B:
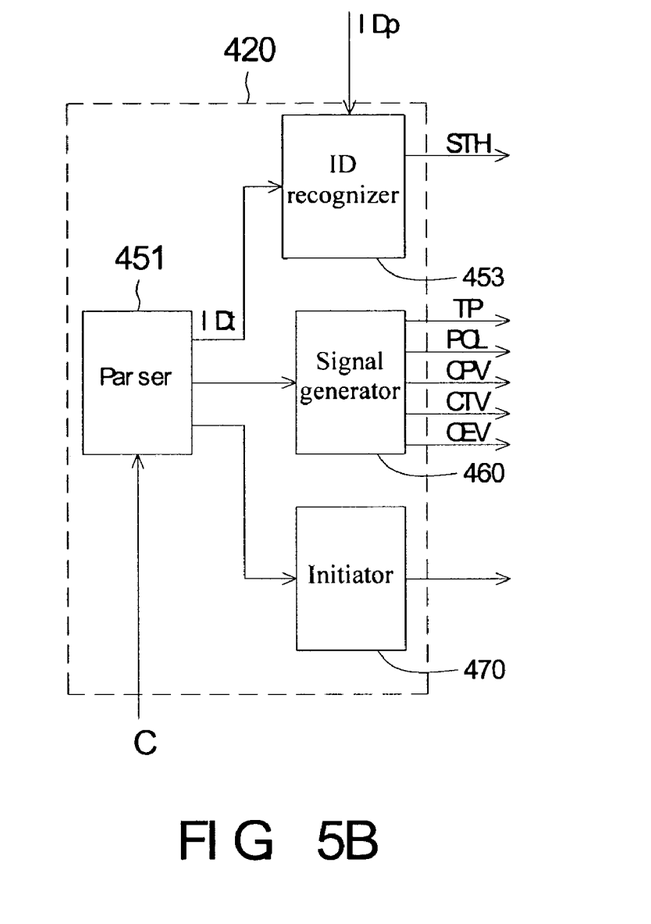
FIG. 5B is a block diagram of the wave generator in FIG. 5A.

FIG. 5B is a block diagram of the wave generator in FIG. 5A. Each of the wave generators 420 and 421 includes a parser 451, an ID recognizer 453, a signal generator 460 and an initiator 470. The parser 451 receives the control bitstream C to parse the control item, including the control field 312 and a data field 314, of a control packet, and sends the parsed control item to the ID recognizer 453, the signal generator 460 or the initiator 470. The control item with the identity event, which is the STH event in this embodiment, is sent to the ID recognizer 453; the control item with the pull high event or the pull low event is set to the signal generator 460; the control item with the initialization event is sent to the initiator 470.

Figure 5C:
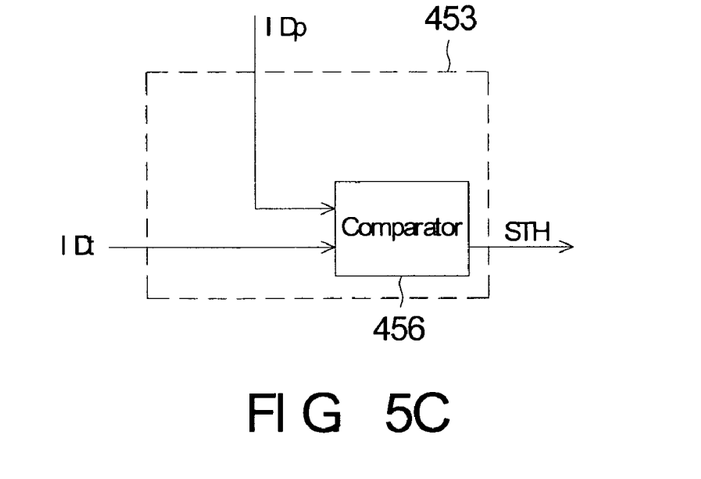
FIG. 5C is a block diagram of the ID recognizer in FIG. 5B.

FIG. 5C is a block diagram of the ID recognizer in FIG. 5B. The recognizer 453 includes a comparator 456. Each source driver has a unique chip identity IDp. The chip identity IDp is set externally, for example by, respectively, pulling high or pulling low the pins of the source driver on the glass substrate. The comparator 456 triggers the signal STH when the comparison of the chip identity IDp with a target identity IDt extracted from the control packet is matched. The duration time td2 of the signal STH can be pre-determined in the comparator 456.

Figure 5D:
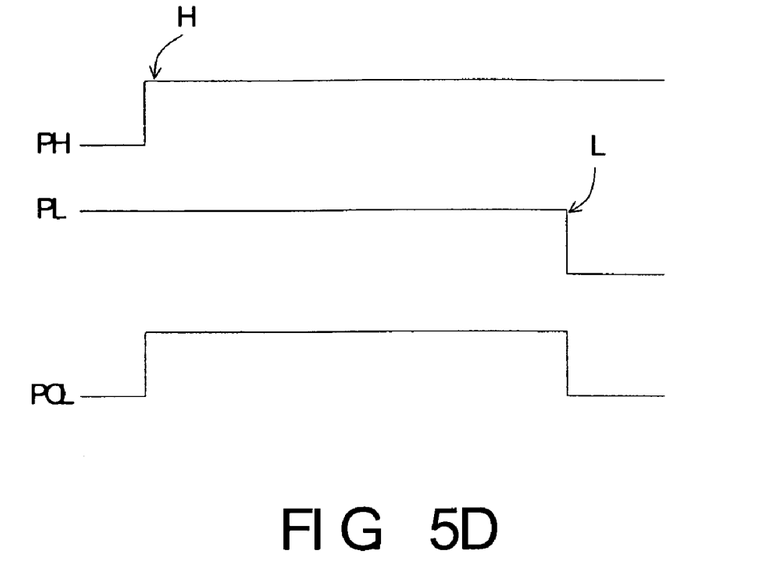
FIG. 5D is a waveform diagram of control signal POL.

The signal generator 460 pulls high the corresponding signal after receiving the control item with the pull high event. The level of the pull-high signal is maintained until the signal generator 460 receives the corresponding control item with the pull low event. Taking generation of the control signal POL for example, FIG. 5D is a waveform diagram of control signal POL. When receiving the control item with the pull high event H, the signal generator 460 pulls high the signal PH; when receiving the control with the corresponding pull low event L, the signal generator 460 pulls low the signal PL. The coupling of the signal PH and the signal PL is the signal POL. The other control signals, such as CPV, STV, OEV, are also generated by the above-mentioned procedure.

Figure 5E:
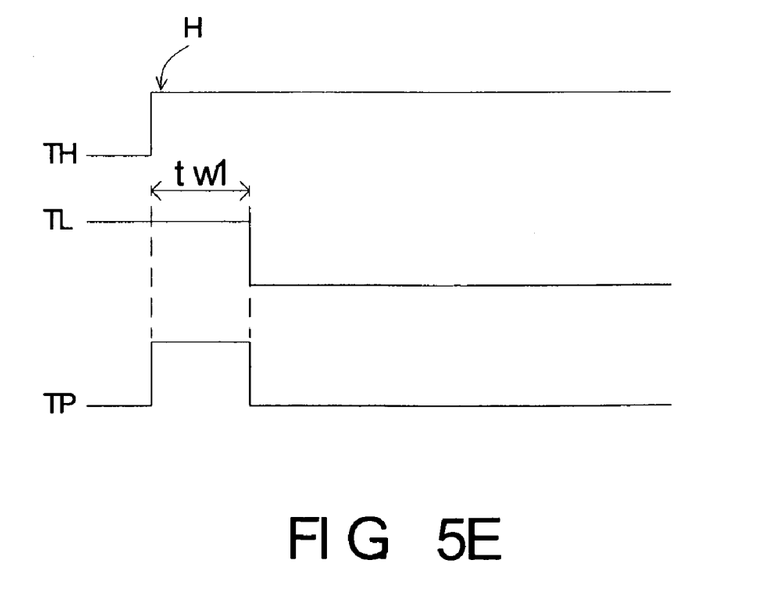
FIG. 5E is a waveform diagram of the generation of the control signal TP.

The control signal is not suitable to be generated by the pull high event and the pull low event if the duration time of the high level of the control signal is less than 8 clocks, such as the control signal TP, since it takes 8 clocks for the wave generator to read a control packet. FIG. 5E is a waveform diagram of the generation of the control signal TP. When receiving the control item with the pull high event H of the control signal TP, the signal generator 460 pulls high the signal TH, then counts for a pre-determined period tw1, and then pulls low the signal TL. The coupling of the signal TH and the signal TL is the control signal TP.

The gate control signals G can also be generated according to the source control signals, such as STH or TP, as shown in FIG. 3. The signal CPV is generated according to the control signal STH. When the control signal STH of the source driver 212(1) is asserted, the counter thereof is activated, and the signal CPV is pulled high after a period td6, and, after a period tw4, the signal CPV is pulled low. The signal STV is generated according to the control signal STH. When the control signal STH of the source driver 212(1) is asserted, the signal STV is pulled high after a period td7 and then pulled low after a period tw5. The signal OEV is generated according to the control signal STH. When the control signal STH of the source driver 212(1) is asserted, the signal OEV is pulled high after a period td8 passed and pulled low after a period tw6 passed.

After receiving the control item with the initialization event, the initiator 470 outputs a DC value to set the corresponding parameter.

The source driver of the present embodiment can reduce the control signal decay because the source control signals are generated by the source driver itself, not by the timing controller in the conventional manner.

In addition, the present embodiment can reduce the number of wires from the timing controller to the gate driver because the source driver can generate the gate control signals and directly send them to the gate driver via the wires on the glass substrate. The quality of the gate control signals are thus improved because the lengths of the transmission wires are reduced.

[Power Management]

Figure 6A:
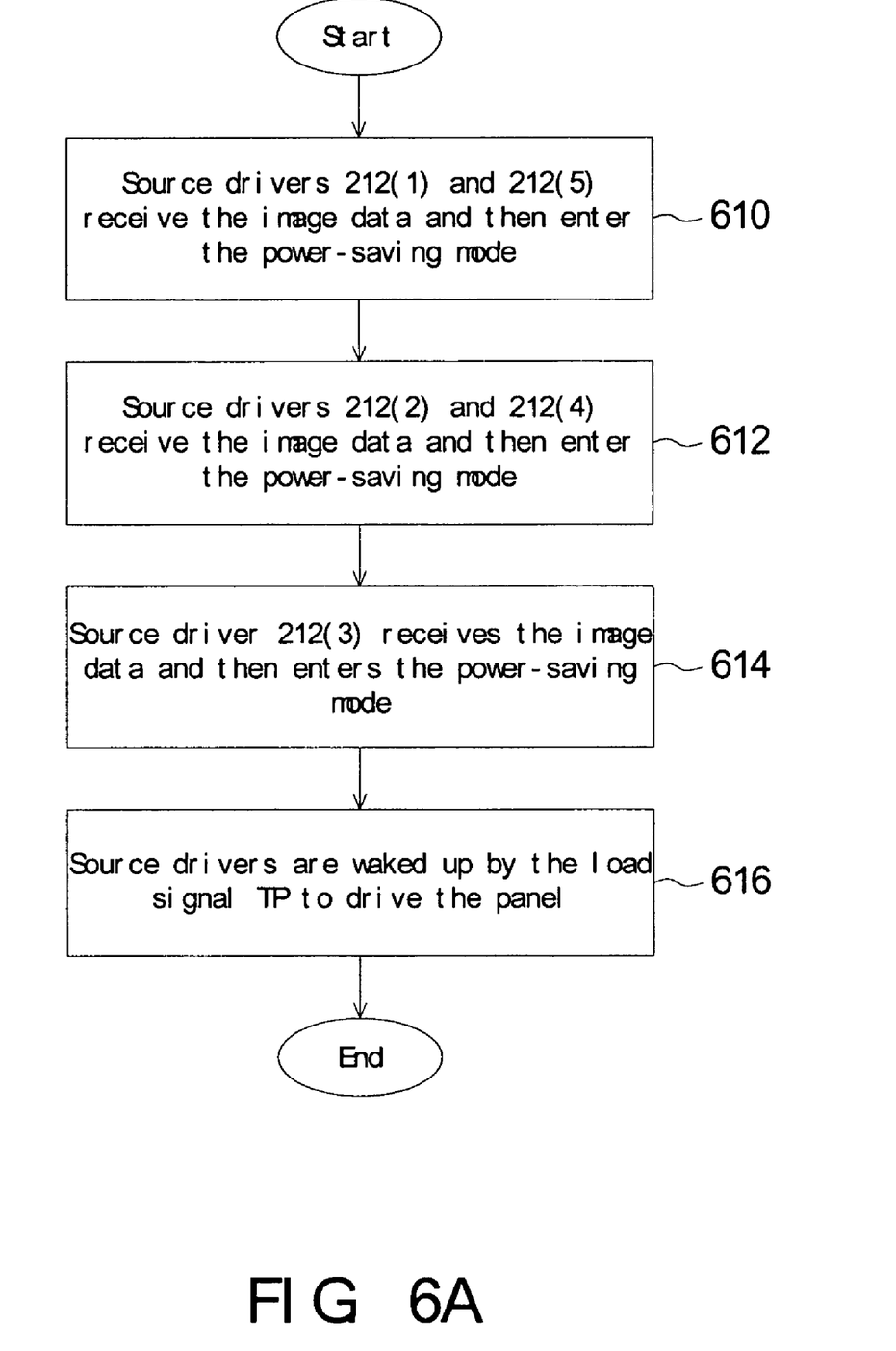
FIG. 6A is a flowchart of a convergent transmission method for power saving.

FIG. 6A is a flowchart of a convergent transmission method for power saving. The source drivers 212(1)-212(5) in FIG. 2A are taken as an example. First, at step 610, the source drivers 212(1) and 212(5), which have the farthest distances away from the timing controller 225, receive the image data transmitted by the timing controller 225 via the source drivers. The power-saving mode is entered, which turns off the power for the data transceivers 424 and 426 of the source drivers 212(1) and 212(5), for example. Next, at step 612, the source drivers 212(2) and 212(4), which are the active ones having the farthest distances away from the timing controller 225, receive the image data and then enter the power-saving mode, which turns of the power for the data transceivers 424 and 426 of the source drivers 212(2) and 212(4), for example. Next, at step 614, the source driver 212(3) receives the image data from the timing controller 225 and then enters the power-saving mode. It is noted that, in the power-saving mode, the power for the control transceiver 416 and 414 of the source driver should not be turned off. Then, at step 616, each of the source drivers 212(1)-212(5) receives the load signal TP and then is activated to start to drive the panel 210. The transmission method can also apply to the source drivers 212(6)-212(10).

Figure 6B:
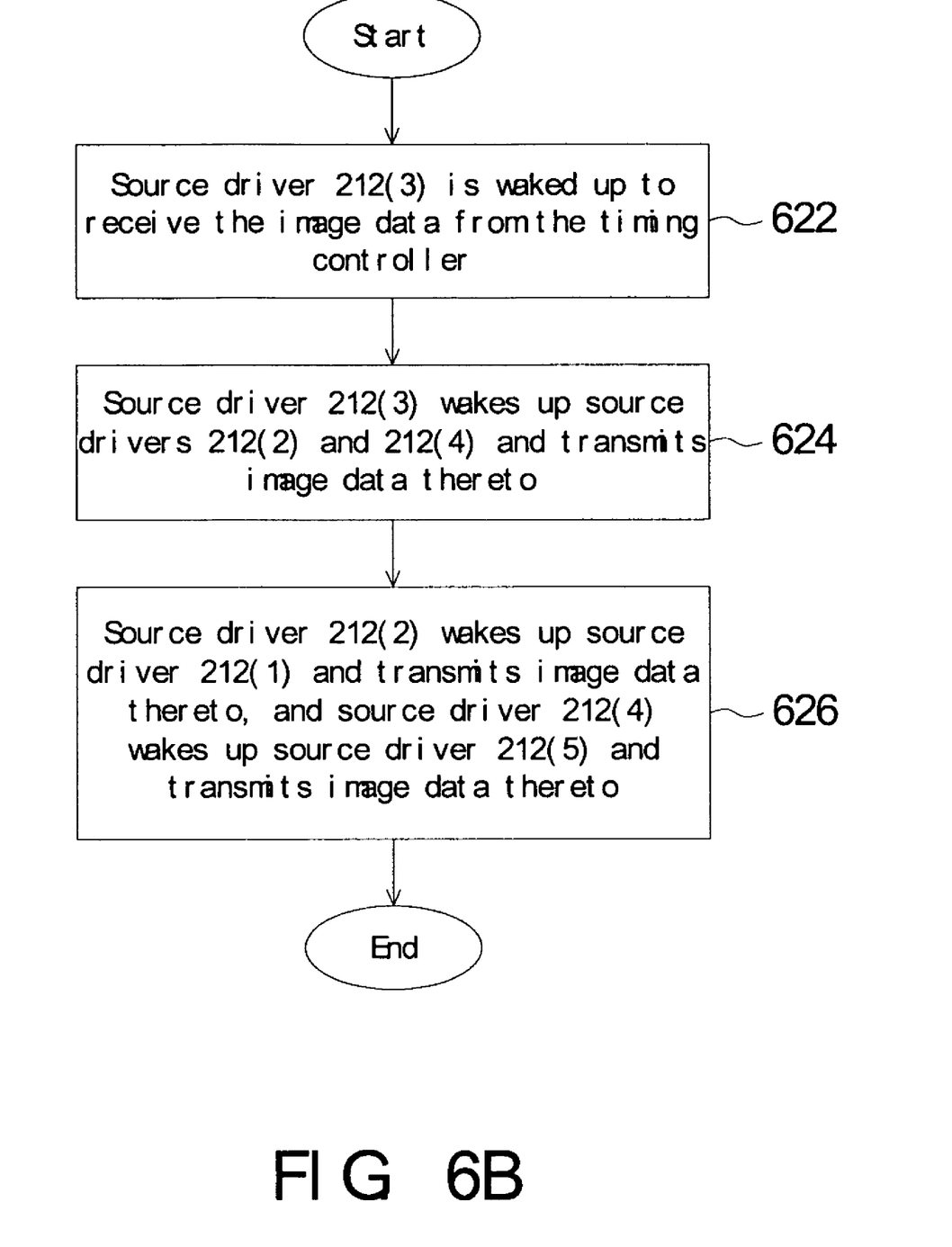
FIG. 6B is a flowchart of a divergent transmission method for power saving.

FIG. 6B is a flowchart of a divergent transmission method for power saving. The source drivers 212(1)-212(5) in FIG. 2A are taken as an example. First, the source drivers 212(1)-212(5) enter the power-saving mode. Next, at step 622, the source driver 212(3), which is nearest to the timing controller 225, is activated to receive the image data transmitted by the timing controller 225. Next, at step 624, the source drivers 212(2) and 212(4) are activated to receive the image data. Next, at step 626, the source drivers 212(1) and 212(5) are activated to receive the image data. The transmission method can also apply to the source drivers 212(6)-212(10).

In the power-saving mode, at least the power for data transceivers and the driving unit can be turned off. The data transceivers transmit the image data, which have large voltage swings and high frequency that make the power consumption great. Thus the power-saving convergent/divergent transmission methods can reduce unnecessary data transmission for saving power. The power for the control transceivers of the source driver should not be turned off, so that the source driver can still receive the control bitstream and operate responsively.

The convergent transmission method and the divergent transmission method can be applied at the same time. For example, the source drivers 212(1)-212(3) can use the convergent transmission method, while the source drivers 212(4)-212(5) use the divergent transmission method, or vice versa.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power saving method of a liquid crystal display comprising a glass substrate, a flexible printed circuit board, a timing controller and source drivers, the source drivers disposed on the glass substrate and connected in series, the flexible printed circuit board connected to one of the source drivers, the method comprising the steps of:
    (a) activating the source drivers;
    (b) transmitting image data and control signals, received by the one source driver from the controller via the flexible printed circuit board to the activated source driver most remote from the one source driver;
    (c) switching the most remote source driver to a power-saving mode; and
    (d) repeating steps (b) and (c) until all the source drivers are switched to the power-saving mode.

2. The method according claim 1, wherein step (a) is executed according to a load signal (TP).

3. The method according to claim 1, wherein in the step of switching to a power-saving mode comprises disabling a data transceiver and a driving unit of the respective source driver.

4. A power saving method of a liquid crystal display having a glass substrate, a flexible printed circuit board, a timing controller and source drivers, the source drivers disposed on the glass substrate and connected in series, the flexible printed circuit board connected to one of the source drivers, the method comprising the steps of:
    (a) switching the source drivers to a power-saving mode;
    (b) transmitting image data and control signals to the one source driver from the controller via the flexible printed circuit board to activate the one source driver;
    (c) transmitting the image data and the control signals from the activated source driver to a source driver in power-saving mode adjacent the activated source driver to activate the adjacent source driver; and
    (d) repeating steps (b) and (c) until all the source drivers are activated.

5. The method according to claim 4, wherein in the power-saving mode a data transceiver and a driving unit of the source driver are disabled.

6. A power saving method of a liquid crystal display comprising a glass substrate, a flexible printed circuit board, a timing controller and source drivers, the source drivers disposed on the glass substrate and connected in series, the flexible printed circuit board connected to the corresponding one of the source, the method comprising:
    (a) transmitting image data and control signals from the controller via the flexible printed circuit board to a first source driver directly connected to the flexible printed circuit board;
    (b) activating source drivers coupled to a first side of the first source driver, and switching source drivers coupled to a second side of the first source driver into a power-saving mode;
    (c) transmitting the image data and the control signals to the activated source driver at the first side most remote from the first source driver, and to the power-saving-mode source driver at the second side nearest to the first source driver;
    (d) switching the activated source driver most remote from the first source driver into the power-saving mode and activating the nearest power-saving-mode source driver; and
    (e) repeating steps (c) and (d) until all the source drivers receive the image data and the control signals.

7. The method according claim 6, wherein step (a) is executed according to a load signal (TP).

8. The method according to claim 6, wherein in the power-saving mode a data transceiver and a driving unit of the source driver are disabled.

* * * * *